United States Patent [19]
Saito et al.

[11] Patent Number: 5,431,928
[45] Date of Patent: Jul. 11, 1995

[54] FEED FOR SWINE AND METHOD OF BREEDING SWINE USING THE SAME

[75] Inventors: Yasuhiro Saito; Kazuhiko Sawada, both of Tokyo; Toshio Oshida, Kanagawa, all of Japan

[73] Assignee: Meiji Seika Kaisha, Ltd., Tokyo, Japan

[21] Appl. No.: 90,473

[22] Filed: Jul. 12, 1993

Related U.S. Application Data

[63] Continuation of Ser. No. 852,558, Mar. 17, 1992, abandoned.

[30] Foreign Application Priority Data

Mar. 18, 1991 [JP] Japan ................. 3-128914

[51] Int. Cl.$^6$ ............ A01K 67/02; A23J 1/20; A23K 1/18
[52] U.S. Cl. ........................ 426/2; 426/656; 426/657; 426/807
[58] Field of Search ............ 426/656, 657, 2, 42, 426/807

[56] References Cited

U.S. PATENT DOCUMENTS

| | | | |
|---|---|---|---|
| 4,816,398 | 3/1989 | Brule et al. | 426/42 |
| 5,028,589 | 7/1991 | Brule et al. | 426/42 |
| 5,085,871 | 2/1992 | Horikawa et al. | 426/2 |

FOREIGN PATENT DOCUMENTS 2218317 11/1989 United Kingdom.

OTHER PUBLICATIONS

Kuono, "Production Casein Phosphopeptide" Patent Abstracts of Japan, Grp No: C260, vol. 9, No. 5, published Jan. 10, 1985 (Japanese Application No. 58-33422) filed Feb. 28, 1983).

Horikawa, "Feed" Patent Abstracts of Japan, Grp. No: C0965, vol. 16, No. 338 published Jul. 22, 1992 (Japanese Application No. 02-213746 filed Aug. 14, 1990).

Morrison "Feeds and Feeding" Morrison Publishing Co, Ithaca, N.Y. (1957) pp.76–79, 164–165, 510–513, 848–851 & 856–857.

Saito "Physiological Activity & Food Uses of CPP (Casein Phosphopeptides)" Chem Abstract vol. 113 (1990) Abstract No. 1705165.

Yamada "The Function & Practical Applications of CPP (Casein Phosphopeptides)" Chem. Abstract vol. 112 (1990) Abstract No. 177306m.

Reproduction, Nutrition, Development, vol. 29, No. 4, 1989, pp. 477–486; A. Pointillart et al.: 'Absence d'effet de l'incorporation d'un phosphopeptide du lait sur l'utilisation du calcium et du phosphore chez le jeune porc' *le document en entier*.

Primary Examiner—Michael W. Ball
Assistant Examiner—Daniel J. Stemmes
Attorney, Agent, or Firm—McAulay Fisher Nissen Goldberg & Kiel

[57] ABSTRACT

A feed for swine containing a casein digestion product of which a principal component is casein phosphopeptide, and a method of breeding a swine which comprises feeding a feed for swine containing 0.01 to 1 part by weight of a casein digestion product of which a principal component is casein phosphopeptide per 100 parts by weight of usual feed for swine. By feeding the feed for swine of the invention, the absorption of minerals, such as calcium and iron is promoted in pregnant sows, resulting in the improvement in the blood properties and milk quality. Piglets are slao improved in the blood properties and ossification degree by feeding the feed for swine of the invention.

11 Claims, No Drawings

FEED FOR SWINE AND METHOD OF BREEDING SWINE USING THE SAME

This is a continuation of application Ser. No. 07/852,558, filed Mar. 17, 1992, now abandoned.

BACKGROUND OF THE INVENTION

This invention relates to a feed for swine containing a casein digestion product of which a principal component is casein phosphopeptide (CPP), and to a method of breeding a swine using the same.

Recently, development in technics is remarkable in the production field of edible animals, such as the improvement in breeding environment, the extension of scale, the improvement of breed and the improvement in feeding system, resulting in the improvement in productivity.

It is necessary for feed to contain various nutrients at a suitable blending ratio in order to conserve the animal life. However, various problems occur due to insufficient nutrient absorption. For example, in the case of piglet, born growth cannot overtake body weight increase due to insufficient utilization of minerals, such as calcium, and problems of weak leg, split of hoof, and so on occur. On the other hand, in the case of breed sow, problems occur, such as weak leg due to insufficient mineral absorption during breeding piglets and insufficient mineral supply to fetuses from pregnant sow. In view of these circumstances, various minerals, such as calcium, are sufficiently added to feeds for breed sow and piglet, as well as phosphorus, various vitamins and so on. Nevertheless, problems of weak leg, split of hoof, inferiority in milk quality, inferiority in piglet blood properties still remained.

On the other hand, CPP is known as a calcium absorption-promoting factor for human, and the properties have been elucidated (H. Naito, Kagaku To Seibutsu, 18, 551–558, 1980, Y. S. Lee, et al., Brit. J. Nutr., 43, 457–467, 1980, Bifidobacterium Microflora, 6(1), 1–6, 1986, U.S. Pat. No. 4,816,398). However, it is not known to add CPP to a feed for swine.

SUMMARY OF THE INVENTION

An object of the invention is to provide a feed for swine capable of improving the absorption rate of minerals, such as calcium and iron, resulting in the resolution of weak leg problem and hoof split problem and resulting in the improvement in the milk quality of breed sow and in the piglet blood properties.

Another object of the invention is to provide a method of breeding swine capable of improving the absorption rate of minerals, such as calcium and iron, resulting in the resolution of weak leg problem and hoof split problem and resulting in the improvement in the milk quality of breed sow and in the piglet blood properties.

The present inventors investigated in order to achieve such objects, and found that, when a casein digestion product of which a principal component is CPP is added to feed for breed sow, the absorption of minerals, such as calcium and iron, is improved, resulting in not only the improvement in the blood properties and milk quality of breed sow but also the improvement in the blood properties, ossification degree and body weight increase of piglet.

Thus, the present invention provides a feed for swine which contains a casein digestion product of which a principal component is caseinphosphopeptide and a method of breeding swine using the same.

DETAILED DESCRIPTION OF THE INVENTION

There are two principal casein phosphopeptides, i.e. α-casein phosphopeptide (α-CPP) derived from α-casein and β-casein phosphopeptide (β-CPP) derived from β-casein.

α-CPP is the peptide chain portion from $Asp^{43}$ to $Lys^{79}$ of α-casein, and has the following structure and properties.

$H_2N$.Asp-Ile-Gly-Ser$^P$-Glu-Ser$^P$-Thr-Glu-Asp-Gln-Ala-Met-Glu-Asp-Ile-Lys-Gln-Met-Glu-Ala-Glu-Ser$^P$-Ile-Ser$^P$-Ser$^P$-Ser$^P$-Glu-Glu-Ile-Val-Pro-Asn-Ser$^P$-Val-Glu-Gln-Lys.COOH

Ser$^P$: L-Phosphoserine

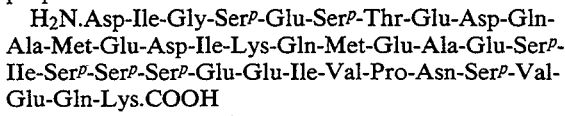

| Molecular weight | 4552 |
| --- | --- |
| Number of phosphate residues | 7 |
| N/P ratio (number of atoms) | 7.2 |
| Number of carboxyl residues | 12 |
| Isoelectric point | pH 1–2 |

β-CPP is the peptide chain portion from N-terminal to $Arg^{25}$ of β-casein, and has the following structure and properties.

$H_2N$.Arg-Glu-Leu-Glu-Glu-Leu-Asp-Val-Pro-Gly-Glu-Ile-Val-Glu-Ser$^P$-Leu-Ser$^P$-Ser$^P$-Ser$^P$-Glu-Glu-Ser-Ile-Thr-Arg.COOH

Ser$^P$: L-Phosphoserine

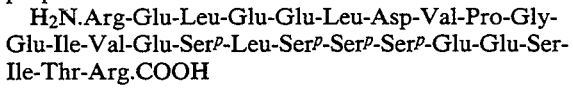

| Molecular weight | 3123 |
| --- | --- |
| Number of phosphate residues | 4 |
| N/P ratio (number of atoms) | 8 |
| Number of carboxyl residues | 7 |
| Isoelectric point | pH 1–2 |

The casein digestion product contains α-CPP, β-CPP and other peptides, and the content of CPP is 6 to 18%, preferably 9 to 15% by weight. The content of CPP can be analyzed by $Fe^{3+}$ affinity chromatography to remove peptides not containing phosphorus, eluting the adsorbed portion, and then reversed-phase chromatography. All peptides containing phosphorus are detected as CPP. As illustrated above, CPP has a phosphoserine residue, and it is considered that minerals are solubilized by combining with the phosphoserine in the digestive tract, and as a result, the absorption of minerals through the intestine is promoted.

The casein digestion product is produced by hydrolyzine casein which usually contains α-casein and β-casein by the action of trypsin. As the raw material casein to be digested, acid casein, sodium caseinate, potassium caseinate and the like are the most preferable, but unpurified ones, such as cow's milk and skim milk, can also be used. The raw material casein is dissolved in water, and trypsin or an enzyme preparation containing trypsin is added in the state of powder or solution. Commercial enzyme preparation derived from pancrease, e.g. pancreatin can be used as the enzyme preparation containing trypsin, but trypsin in crystal grade is preferred in view of the yield of CPP and so on. As the digestion conditions in the industiral production, a suitable casein concentration is not more than 30%, preferably 2 to 30%, and a suitable enzyme amount is 0.001% to 2% by weight of the substrate casein as crystalline trypsin. The digestion is preferably conducted at pH 6.0 to 9.0 at 15° to 60° C., preferably 20° to 50° C., for 5 minutes to 100 hours.

A suitable blending amount of the casein digestion product is 0.01 to 1 part, preferably 0.02 to 0.2 part, by weight per 100 parts by weight of usual feed, e.g. commercial feed, for swine, such as breed sow or piglet. The feed for swine may be fed to swine irrespective of the kind, growth stage, etc. of swine. However, it is preferred to feed the feed for swine to breed sow from 50th day after pregnancy, when nutrition requirement increases at the embryos, to the weaning. Piglet is also preferred.

measured as to hemoglobin (Hb), hematocrit value (Ht), iron content in serum (Fe), calcium content in serum (Ca), magnesium content in serum (Mg), inorganic phosphorus in serum (IP) and total protein in serum (TP), and the milk was measured as to iron content (M.Fe), calcium content (M.Ca), magnesium content (M. Mg), inorganic phosphorus content (M.IP) and total protein content (M.TP). The results are summarized in Table 1 and Table 2.

TABLE 1

Blood Properties of Pregnant Sow According to Administration of Casein Digestion Product

| | Hb (g/dl) | | HT (%) | | TP (g/dl) | |
|---|---|---|---|---|---|---|
| | Test Group | Control Group | Test Group | Control Group | Test Group | Control Group |
| After 50 days from pregnancy | 13.0 ± 0.85 | 12.4 ± 0.92 | 30.6 ± 5.12 | 32.0 ± 1.58 | 6.6 ± 0.87 | 6.3 ± 0.62 |
| Childbirth day | 12.1 ± 1.55 | 11.4 ± 1.51 | 32.3 ± 2.89 | 31.3 ± 4.87 | 5.9 ± 0.93 | 6.6 ± 0.37 |
| After 21 days from childbirth | 12.6 ± 2.00 | 11.7 ± 3.67 | 30.3 ± 3.82 | 32.1 ± 2.06 | 7.0 ± 0.82 | 7.2 ± 0.25 |

| | | Fe (μg/dl) | | Ca (mg/dl) | | Mg (mg/dl) | | IP (mg/dl) | |
|---|---|---|---|---|---|---|---|---|---|
| | | Test Group | Control Group | Test Group | Control Group | Test Group | Control Group | Test Group | Control Group |
| After 50 days from pregnancy | Blood | 127 ± 16.9 | 145 ± 13.0 | 8.7 ± 0.48 | 8.5 ± 0.58 | 2.0 ± 0.10 | 2.2 ± 0.18 | 6.0 ± 0.26 | 6.1 ± 0.31 |
| Childbirth day | Blood | 180 ± 16.5 | 150 ± 8.8[b] | 9.0 ± 1.58 | 9.3 ± 1.08 | 2.1 ± 0.26 | 1.8 ± 0.10[a] | 6.4 ± 0.82 | 6.1 ± 0.75 |
| After 21 days from childbirth | Blood | 155 ± 13.2 | 138 ± 13.9 | 8.8 ± 0.27 | 8.6 ± 1.17 | 2.2 ± 0.29 | 1.9 ± 0.22 | 4.9 ± 0.55 | 4.6 ± 0.21 | m + SD_[a]: There is a significant difference (p < 0.05)  _[b]: There is a significant difference (p < 0.01)

TABLE 2

Mineral Components of Milk According to Administration of Casein Digestion Product

| | Childbirth day | | After 21 days from childbirth | |
|---|---|---|---|---|
| Item | Test Group | Control Group | Test Group | Control Group |
| M.Fe (mg/100 g) | 0.394 ± 0.0518 | 0.280 ± 0.0643[b] | 0.325 ± 0.0600 | 0.258 ± 0.0377 |
| M.Ca (mg/100 g) | 93.2 ± 10.90 | 65.5 ± 5.78[b] | 180.5 ± 7.33 | 156.3 ± 6.63[b] |
| M.Mg (mg/100 g) | 9.9 ± 0.32 | 8.5 ± 0.73[b] | 10.4 ± 0.83 | 10.3 ± 0.61 |
| M.IP (mg/100 g) | 117.3 ± 9.10 | 92.0 ± 6.48[a] | 133.2 ± 3.90 | 126.8 ± 8.62 |
| M.TP (mg/100 g) | 17.3 ± 1.30 | 11.8 ± 2.29[b] | 5.3 ± 0.27 | 5.4 ± 0.18 | m + SD_[a]: There is a significant difference (p < 0.05)  _[b]: There is a significant difference (p < 0.01)

EXAMPLES

Example 1

A commercial casein digestion product ("Meiji CPP-1", manufacture by Meiji Seika Kaisha, Ltd.) containing 12% by weight of CPP was added in an amount of 0.04% by weight to a commercial feed for breed sow to prepare the feed for breed sow. Ten breed sows were divided into a test group composed of six sows and a control group composed of four sows, and the above feed for breed sow containing the casein digestion product was fed to the test group, while the commercial feed for breed sow not containing the casein digestion product was fed to the control group, respectively from the 50th day after pregnancy.

Blood of each sow was analyzed on the start day, the childbirth day and the 21th day after the childbirth, and milk of each sow was analyzed on the childbirth day and the 21th day after the childbirth. The blood was As shown in Table 1, in the blood of the test group, Fe and Mg were significantly higher than those of the control group at the childbirth day. With respect to milk, as shown in Table 2, Fe, Ca, Mg, IP and TP of the test group were significantly higher than those of the control group or the childbirth day and Ca of the test group was significantly higher than that of the control group on the 21th day after the childbirth.

Example 2

63 piglets born from 6 mother sows of the test group and 40 piglets born from 4 mother sows of the control group of Example 1 were lived together with their mother sows, and bred by mother's milk alone until the weaning time, i.e. the 23th day after the birth.

The blood properties and body weight of respective piglets were measured after 7 days, 21 days and 35 days from the birth, and shown in Table 3. The ossification state of the lower leg bone at the weaning time (the 21th day after the birth) was measured, and the results are shown in Table 4.

TABLE 3

Blood Properties and Body Weight Increase of Piglet According to Administration of Casein Digestion Product

| | Hb (g/dl) | | Ht (%) | | TP (g/dl) | | Body Weight (kg) | |
|---|---|---|---|---|---|---|---|---|
| | Test Group | Control Group | Test Group | Control Group | Test Group | Control Group | Test Group | Control Group |
| After 7 days from birth | 8.9 ± 1.16 | 9.0 ± 10.5 | 28.1 ± 1.50 | 26.7 ± 1.85[b] | 5.9 ± 0.36 | 5.3 ± 0.70[b] | 1.7 ± 0.29 | 1.5 ± 0.26[b] |
| After 21 days from birth | 8.9 ± 1.15 | 7.7 ± 1.20[b] | 27.9 ± 1.99 | 24.2 ± 1.62[b] | 5.4 ± 0.46 | 5.2 ± 0.55[a] | 5.1 ± 0.94 | 5.1 ± 0.79 |
| After 35 days from birth | 9.6 ± 0.74 | 9.3 ± 0.92 | 29.9 ± 1.67 | 30.3 ± 2.42 | 4.6 ± 0.26 | 4.7 ± 0.35 | 8.4 ± 0.57 | 8.2 ± 0.44[a] |

| | | Fe (μg/dl) | | Ca (mg/dl) | | Mg (mg/dl) | | IP (mg/dl) | |
|---|---|---|---|---|---|---|---|---|---|
| | | Test Group | Control Group | Test Group | Control Group | Test Group | Control Group | Test Group | Control Group |
| After 7 days from birth | Blood | 42 ± 8.7 | 29 ± 5.9[b] | 10.3 ± 1.16 | 10.5 ± 1.52 | 2.5 ± 0.27 | 2.3 ± 0.21[b] | 7.9 ± 0.73 | 7.4 ± 0.59 |
| After 21 days from birth | Blood | 35 ± 6.9 | 32 ± 6.5 | 10.3 ± 0.74 | 10.2 ± 0.46 | 2.2 ± 0.33 | 2.1 ± 0.32[a] | 7.9 ± 0.57 | 7.4 ± 0.78[a] |
| After 35 days from birth | Blood | 208 ± 21.2 | 167 ± 22.3[b] | 10.3 ± 0.77 | 10.6 ± 1.23 | 2.2 ± 0.39 | 2.1 ± 0.25 | 7.5 ± 0.74 | 7.1 ± 0.75[b] | m + SD—[a]: There is a significant difference ($p < 0.05$)  —[b]: There is a significant difference ($p < 0.01$)

TABLE 4

Influence of Administration of CPP upon Ossification Degree of Piglet

| | Test Group | Control Group |
|---|---|---|
| Inside Portion of Knee Bone | 175 ± 9.6 | 162 ± 7.8 |
| Central Portion of Anklebone | 203 ± 8.8 | 193 ± 13.0 |

As shown in Table 3, the piglets born from the mother sows of the test group were significantly higher than those born from the mother sows of the control group, in Ht, Fe, Mg, IP, TP and body weight on the 7th day after the birth, Hb, Mt, Mg, IP and TP or the 21th day after the birth and Fe, IP and body weight on the 35th day after the birth. The ossification degree of the test group was higher than that of the control group, as shown in Table 4.

Example 3

A commercial digestion product ("Meiji CPP-1", manufactured by Meiji Seika Kaisha, Ltd.) containing 12% by weight of CPP was added in an amount of 0.04% by weight to a commercial feed for piglet to prepare the feed for piglet. 103 piglets on 15th day after the birth were divided into a test group composed of 63 piglets and a control group composed of 40 piglets. The above feed for piglet containing the casein digestion product was fed to the test group, while the commercial feed for piglet not containing the casein digestion product was fed to the control group, respectively. On the 22nd day after the birth, the feed was changed to a commercial feed for fatting up, and the test was continued. The blood properties and the ossification degree of each piglet were measured, and the results are shown in Table 5 and Table 6. The ossification degree was estimated by taking an X-ray photograph at the lower leg portion of all piglets and measuring the transmittance of the shadow image by a transmissive densitometer.

TABLE 5

Influence of Administration of CPP upon Blood Properties of Piglet

| | Hb (g/dl) | | Ht (%) | | TP (g/dl) | | ALP (IU/1) | |
|---|---|---|---|---|---|---|---|---|
| | CPP Administration Group | Control Group | CPP Administration Group | Control Group | CPP Administration Group | Control Group | CPP Administration Group | Control Group |
| After 7 days from birth | 10.0 ± 0.9 | 10.0 ± 0.5 | 32.0 ± 2.3 | 32.1 ± 2.0 | 5.5 ± 0.5 | 5.6 ± 0.5 | 2515 ± 795 | 2099 ± 337 |
| After 21 days from birth | 12.6 ± 0.8 | 12.6 ± 0.8 | 39.6 ± 2.5 | 39.7 ± 1.2 | 5.3 ± 0.4 | 5.0 ± 0.3 | 1028 ± 262 | 1002 ± 181 |
| After 35 days from birth | 10.2 ± 0.8 | 10.5 ± 0.7 | 32.7 ± 1.0 | 33.3 ± 1.0 | 5.4 ± 0.2 | 5.1 ± 0.5 | 493 ± 71 | 513 ± 86 |

| | Fe (μg/dl) | | Ca (mg/dl) | | Mg (mg/dl) | | IP (mg/dl) | |
|---|---|---|---|---|---|---|---|---|
| | CPP Administration Group | Control Group | CPP Administration Group | Control Group | CPP Administration Group | Control Group | CPP Administration Group | Control Group |
| After 7 days from birth | 768 ± 510 | 649 ± 429 | 11.1 ± 0.5 | 11.2 ± 0.5 | 2.8 ± 0.3 | 2.6 ± 0.2 | 8.7 ± 1.0 | 8.3 ± 0.4 |
| After 21 days from birth | 178 ± 47 | 176 ± 47 | 10.9 ± 0.6 | 10.8 ± 0.4 | 2.2 ± 0.2 | 2.2 ± 0.2 | 8.4 ± 0.6 | 8.5 ± 0.6 |
| After 35 days from birth | 129 ± 73 | 124 ± 36 | 10.4 ± 0.5 | 10.5 ± 0.5 | 2.1 ± 0.1 | 2.2 ± 0.1 | 8.4 ± 0.5 | 8.3 ± 0.5 | m + SD,—: There is a significant difference ($p < 0.05$)

TABLE 6

Influence of Administration of CPP upon Ossification Degree of Piglet

| | Near Portion of Kneed Bone | | Central Portion of Knee Bone | | Far Portion of knee Bone | |
|---|---|---|---|---|---|---|
| | CPP Administration Group | Control Group | CPP Administration Group | Control Group | CPP Administration Group | Control Group |
| Birth day | 0.99 ± 0.20 | 1.02 ± 0.25 | 1.04 ± 0.26 | 1.08 ± 0.30 | — | — |
| After 25 days from birth | — | — | 1.84 ± 0.08 | 1.72 ± 0.03 | — | — |
| After 55 days from birth | — | — | 2.10 ± 0.05 | 2.08 ± 0.06 | 2.17 ± 0.09 | 2.10 ± 0.02 |

| | | | Central Portion of Splint Bone | | Central Portion of Anklebone | |
|---|---|---|---|---|---|---|
| | | | CPP Administration Group | Control Group | CPP Administration Group | Control Group |
| | | Birth day | 0.79 ± 0.18 | 0.83 ± 0.24 | 0.78 ± 0.10 | 0.78 ± 0.13 |
| | | After 21 days from birth | 1.65 ± 0.01 | 1.64 ± 0.16 | 1.58 ± 0.08 | 1.46 ± 0.06 |
| | | After 35 days from birth | 2.09 ± 0.16 | 1.89 ± 0.05 | 1.70 ± 0.13 | 1.48 ± 0.15 | m + SD,—: Not measured
_: There is a significant difference ($p < 0.05$), _: There is a significant difference ($p < 0.01$)

As shown in Table 5, TP in the blood of the test group was significantly higher than that of the control group. As shown in Table 6, the ossification degree of the test group was higher than that of the control group at the central portion of the splint bone and the central portion of the anklebone.

By feeding the feed for swine of the invention, the absorption of minerals, such as calcium and iron is promoted in pregnant sows, resulting in the improvement in the blood properties and milk quality. As a result, piglets are improved in their blood properties, ossification degree and body weight increase. Piglets are also improved in the blood properties and ossification degree by feeding the feed for swine of the invention. Thus, the productivity and feed efficiency can be improved for breeding swine.

We claim:

1. A method for improving the ossification degree of piglets which comprises feeding to a breed sow thereof at least from the 50th day after pregnancy, a feed containing 0.01 to 1 part by weight per 100 parts by weight of the feed of a casein digestion product which contains 6 to 18% by weight of casein phosphopeptide.

2. The method of claim 1 wherein the feet contains 0.02 to 0.2 parts by weight per 100 parts by weight of the feed of a casein digestion product which contains 6 to 18% by weight of casein phosphopeptide.

3. The method of claim 1 wherein said feeding is continued at least until weaning.

4. The method of claim 1 wherein the casein digestion product is present in an amount from 0.02 to 0.2 parts by weight.

5. The method of claim 1 wherein the casein digestion product is obtained by digesting acid casein, sodium caseinate, or potassium caseinate.

6. The method of claim 1 wherein the casein digestion product is obtained by digesting unpurified casein.

7. A method for breeding piglets which comprises feeding to a breed sow at least from the 50th day after pregnancy to the weaning of the piglets a feed containing 0.01 to 1 part by weight per 100 parts by weight of the feed of a casein digestion product which contains 6 to 18% by weight of casein phosphopeptide.

8. The method of claim 7 wherein the casein digestion product is present in an amount from 0.02 to 0.2 parts by weight.

9. The method of claim 7 wherein the casein digestion product is produced by digesting casein in a concentration of 2 to 30% in the presence of trypsin in an amount of 0.001 to 2% by weight crystalline trypsin at a pH of 6.0 to 9.0 at 20° to 50° C. for 5 minutes to 100 hours.

10. A method for improving the ossification degree of piglets which comprises feeding to the mother sow thereof until weaning of the piglets, a feed containing 0.01 to 1 part by weight per 100 parts by weight of the feed of a casein digestion product which contains 6 to 18% by weight of casein phosphopeptide.

11. The method of claim 10 wherein the casein digestion product is present in an amount from 0.02 to 0.2 parts by weight.

* * * * *